US007191138B1

(12) United States Patent
Roy et al.

(10) Patent No.: US 7,191,138 B1
(45) Date of Patent: *Mar. 13, 2007

(54) SYSTEM FOR CATALOGING, INVENTORYING SELECTING, MEASURING, VALUING AND MATCHING INTELLECTUAL CAPITAL AND SKILLS WITH A SKILL REQUIREMENT

(75) Inventors: Malcolm Roy, Ft. Walton Beach, FL (US); Robert Reno, Ft. Walton Beach, FL (US); Calvin Ward, Ft. Walton Beach, FL (US)

(73) Assignee: Mindloft Corporation, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/549,079

(22) Filed: Apr. 15, 2000

(51) Int. Cl.
 *G06Q 99/00* (2006.01)
(52) U.S. Cl. ................ 705/1; 705/3; 705/7; 705/9; 705/10; 705/11; 705/31; 707/9; 434/219
(58) Field of Classification Search .......... 705/1, 705/3, 5, 7–11, 32; 235/376; 707/3, 2, 102; 434/219
See application file for complete search history.

(56) References Cited

U.S. PATENT DOCUMENTS

| 4,337,048 | A |   | 6/1982  | Hatch et al.       |       |
|-----------|---|---|---------|--------------------|-------|
| 5,117,353 | A |   | 5/1992  | Stipanovich et al. |       |
| 5,164,897 | A | * | 11/1992 | Clark et al. ..... | 705/1 |
| 5,197,004 | A | * | 3/1993  | Sobotka et al. ... | 705/8 |
| 5,416,694 | A | * | 5/1995  | Parrish et al. ... | 705/8 |
| 5,551,880 | A |   | 9/1996  | Bonnstetter et al. |        |
| 5,566,333 | A | * | 10/1996 | Olson et al. ..... | 707/102 |
| 5,758,324 | A | * | 5/1998  | Hartman et al. ... | 705/1 |
| 5,788,504 | A |   | 8/1998  | Rice et al.        |        |
| 5,924,072 | A | * | 7/1999  | Havens ........... | 705/1 |

(Continued)

FOREIGN PATENT DOCUMENTS

WO       WO 99/39716       *  9/1998

(Continued)

OTHER PUBLICATIONS

Tapsell, Sherrill, "Making money from brainpower: The new wealth of nations", Jul. 1998, Management-Aucklan, v45n6, pp. 36-43.*
Greengard, Samuel, "Storing, Shaping and sharing collective wisdom", Oct. 1998, Workforce, v77n10 pp. 82-88.*

*Primary Examiner*—John W. Hayes
*Assistant Examiner*—Freda A Nelson
(74) *Attorney, Agent, or Firm*—Frank A. Cona

(57) ABSTRACT

The present invention is directed to a system for cataloging, inventorying, selecting, measuring, valuing and matching Intellectual Capital skills and matching or inquiring of an individual's skills, and particularly to a system for finding candidates for an employment or consulting position having requisite skills, and more particularly to a system for creating a searchable knowledge base of individuals skills indexed in a hierarchical cataloging, measuring and valuation system. The present invention includes generating a list of Intellectual Capital Codes based upon a standardized skills catalog which contains a set of skill categories organized in a hierarchical manner with a unique code assigned to each category within each hierarchical level, wherein the combination of at least one code from at least one of the hierarchical levels forms an Intellectual Capital code.

88 Claims, 9 Drawing Sheets

U.S. PATENT DOCUMENTS

| | | | |
|---|---|---|---|
| 5,930,785 A | 7/1999 | Lohman et al. | |
| 5,974,407 A * | 10/1999 | Sacks | 707/2 |
| 5,978,767 A | 11/1999 | Chriest et al. | |
| 5,978,768 A * | 11/1999 | McGovern et al. | 705/1 |
| 6,032,151 A | 2/2000 | Arnold et al. | |
| 6,070,143 A * | 5/2000 | Barney et al. | 705/8 |
| 6,266,659 B1 * | 7/2001 | Nadkarni | 707/3 |
| 6,272,467 B1 * | 8/2001 | Durand et al. | 705/1 |
| 6,275,812 B1 * | 8/2001 | Haq et al. | 705/11 |
| 6,363,376 B1 * | 3/2002 | Wiens et al. | 707/3 |
| 6,385,620 B1 * | 5/2002 | Kurzius et al. | 705/1 |
| 6,411,936 B1 * | 6/2002 | Sanders | 705/10 |
| 6,873,964 B1 * | 3/2005 | Williams et al. | 705/9 |
| 2001/0042000 A1 * | 11/2001 | DeFoor, Jr. | 705/9 |

FOREIGN PATENT DOCUMENTS

| | | | |
|---|---|---|---|
| WO | WO 99/54835 | * | 10/1999 |
| WO | WO 99/54835 A1 | * | 10/1999 |
| WO | WO 01/03034 A1 | * | 1/2001 |
| WO | WO 01/39078 A1 | * | 5/2001 |
| WO | WO 01/061527 A2 | * | 8/2001 |

* cited by examiner

Fields marked in red are required.
[ ] ClientName Job

SkillMatch

Title [Title]
Client Contact [LAST NAME, FIRST NAME - TITLE ▼]   Current Status [Inactive ▼]
Fill By Date [Apr ▼] [14 ▼] [2000 ▼]   Salary Type [Yearly ▼]
State [FL ▼]   Travel [20%  ▼]
Salary From [$8,000.00]   Salary To [$8,000.00]
Description [Description]

Internal Notes

[Edit]

Edit Skills

Current Skills Listed

Application Software/Database/File Based/
 -Access   Years Used: 1, Last Used:1999, C U P I D
 -FoxPro   Years Used: 1, Last Used:1999, C U P I D
 -Paradox  Years Used: 1, Last Used:1999, C U P I D
Application Software/Database/Server Based/
 -Clipper  Years Used: 1, Last Used:1999, C U P I D
 -Dbase    Years Used: 1, Last Used:1999, C U P I D

*Figure 3(a)*

| Retrieve Candidates for Title | | |
|---|---|---|
| [ ] First Name Last Name | 70% Review Interview | 30% Review SkillMatch |
| [ ] First Name Last Name | 70% Review Interview | 30% Review SkillMatch |

*Figure 3(b)*

The following skills for Title – ClientName are MATCHED by First Name Last Name (3)

Application Software/Database/File Based/
 -Access
  Years Used: 1<2 , Last Used: 1999=1999 , C U P I D / 0 0 0 I 0
 -Paradox
  Years Used: 1<5 , Last Used: 1999=1999 , C U P I D / C Q 0 0 0
Application Software/Database/Server Based/
 -Dbase
  Years Used: 1=1 , Last Used: 1999=1999 , C U P I D / 0 0 P 0 0

The following skills for Title – ClientName are NOT MATCHED by First Name Last Name (7)

Application Software/Database/File Based/
 -FoxPro Last Used: 1999 Years Used: 1 / C U P I D
Application Software/Database/Server Based/
 -Clipper Last Used: 1999 Years Used: 1 / C U P I D
 -ESS Base Last Used: 2000 Years Used: 1 / C U P I D
 -SQL Server Last Used: 1999 Years Used: 1 / C U P I D
Application Software/Email/Client/
 -Eudora Last Used: 1999 Years Used: 1 / C U P I D
 -Outlook Last Used: 1999 Years Used: 1 / C U P I D
Application Software/Email/Server/
 -Exchange Last Used: 1999 Years Used: 1 / C U P I D First Name Last Name has the following skills NOT REQUIRED by Title – ClientName (1)

Application Software/Database/Server Based/
 -Informix Last Used: 1996 Years Used: 5 / C 0 0 0 D

| Title – ClientName | | Contact Information | First Name Last Name – Title |
|---|---|---|---|
| FIRST NAME LAST NAME<br>Work Phone<br>EMAIL | | | First Name Last Name<br>Phone Home<br>Email |

*Figure 3(c)*

SYSTEM FOR CATALOGING, INVENTORYING SELECTING, MEASURING, VALUING AND MATCHING INTELLECTUAL CAPITAL AND SKILLS WITH A SKILL REQUIREMENT

BACKGROUND OF THE INVENTION

1. Field of the Invention

The present invention relates to a system for the cataloging, inventorying, selecting, measuring, valuing and matching Intellectual Capital and matching or inquiring of an individual's skills, and particularly to a system for finding candidates for an employment or consulting position having requisite skills, and more particularly to a system for creating a searchable knowledge base of individuals skills indexed in a hierarchical cataloging, measuring and valuation system.

2. Description of the Prior Art

Historically, businesses have been forced to base the valuation of human skills (or "Intellectual Capital") of individuals, whether for employment, training, or acquisition purposes, solely on past performance and education. In the systems of the prior art, determining the Intellectual Capital of current employees or employment candidates has been inefficient, cumbersome and imprecise, often relying on subjective written skill descriptions that do not use any uniform, consistent or regulated terminology, which would allow for an accurate and systematic search and result in an unbiased and equitable comparison of candidate skills.

For example, an electronic search for employment candidates in this manner has typically been accomplished in the prior art by utilizing a database of candidate resumes, wherein the text of each resume is indexed in the database and is searched through a user interface. Because candidate resumes contain subjective written descriptions of the candidate's Intellectual Capital that can vary widely in terminology, key word searching of these databases to match a candidate's skills with the requirements of the position in question is inefficient and imprecise.

As the world moves into the information age, Intellectual Capital has become paramount in determining future success of businesses wishing to participate in the 'new economy.' The weakness of Intellectual Capital is the inability to measure it in any meaningful sense.

Accordingly, a workable and efficient system is needed for inventorying, measuring, and valuing an individual's Intellectual Capital, which can be used to create an Intellectual Capital code that embodies the relative value of that individual's Intellectual Capital.

SUMMARY OF THE INVENTION

The present invention is directed to a method and apparatus for cataloging, inventorying, selecting, measuring, valuing and matching Intellectual Capital and matching or inquiring of an individual's skills, and particularly to a system for finding candidates for an employment or consulting position having requisite skills, and more particularly to a system for creating a searchable knowledge base of individuals skills indexed in a hierarchical cataloging, measuring and valuation system.

The method of the present invention may include the steps of determining a hierarchical list of Intellectual Capital categories; assigning at least one of the individual skills to the Intellectual Capital categories; assigning an Intellectual Capital code to each of the assigned individual skills; and arranging the hierarchical list such that the combination of at least one Intellectual Capital code from at least one of the Intellectual Capital categories forms an individual Intellectual Capital code for the individual.

The apparatus of the present invention may include a data source for storing the aforementioned hierarchical list, a user interface, and a data source interface inventorying, selecting, measuring, valuing and matching Intellectual Capital and matching or inquiring of an individual's skills contained in the data source.

BRIEF DESCRIPTION OF THE DRAWINGS

FIGS. 2(a)–(e) are a series of computer screen shots of input forms submitted by a prospect using a preferred embodiment of the present invention.

FIGS. 3(a)–(c) are a computer screen shots of results screens retrieved by a prospect using a preferred embodiment of the present invention.

DETAILED DESCRIPTION OF THE PREFERRED EMBODIMENT

Figure 1:
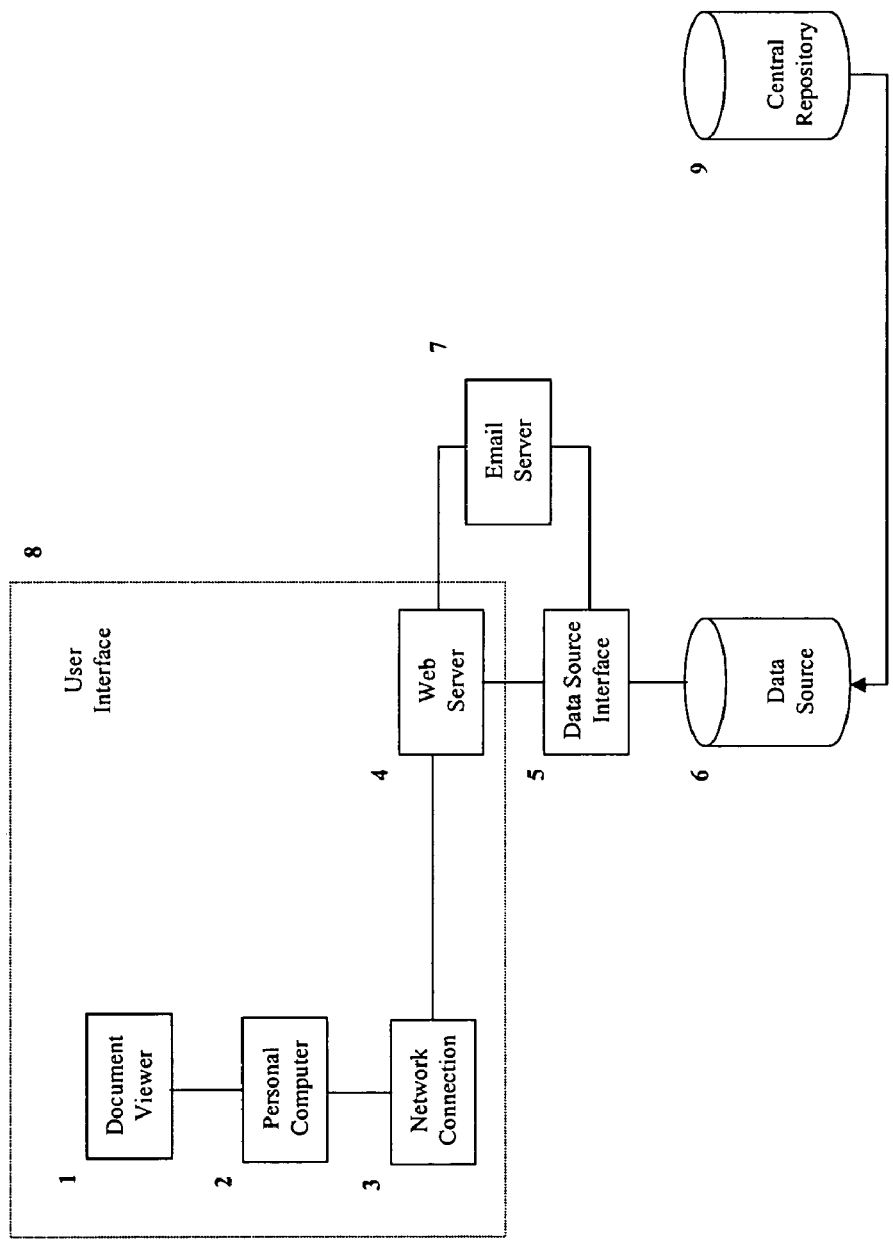
FIG. 1 is a block diagram illustrating a preferred embodiment of the present invention used over the Internet.

The present invention will be understood more fully from the detailed description given below and from the accompanying drawings of preferred embodiments of the invention which, however, should not be taken to limit the invention to a specific embodiment but are for explanation and understanding only.

In accordance with the present invention, the first step in the utilization of Intellectual Capital its measurement and identification. In order to properly inventory Intellectual Capital, a hierarchical cataloging system provides the most portability and is preferred. In accordance with aspects of the present invention, this catalog will preferably consist of five levels in the hierarchy, although more or less levels can be used. The preferred names for these five levels are Class, Knowledge Group, Skill Group, Skill Set, and Skills. These names are not meant to be exclusive or inclusive, but to be illustrative of the hierarchical nature of the categories. In this fashion, codes may be determined for each category within each level and from which a combination of codes from the different levels will result in an individual's Intellectual Capital Code.

One possible breakdown of this hierarchy is shown in Table 1:

TABLE 1

| Hierarchical Levels: | Hierarchical Level Code: |
|---|---|
| Level 1: Class | |
| Category 1: IT (Information Technology) | 01 |
| Category 2: | |
| Level 2: Knowledge Group | |
| Category 1: Application Software | 09 |
| Category 2: | |
| Level 3: Skill Group | |
| Category 1: eMail | 55 |
| Category 2: | |
| Level 4: Skill Set | |
| Category 1: Server | 021 |
| Category 2: | |

TABLE 1-continued

| Hierarchical Levels: | Hierarchical Level Code: |
|---|---|
| Level 5: Skills | |
| Category 1: iMail | 233 |
| Category 2: | |

For example, in a preferred embodiment of the present invention, these codes may be used to create an individual's Intellectual Capital code such as "01-09-55-021-233". The format of this number would be standardized for use in multiple applications. It will be readily apparent to those of ordinary skill in the art that a variety of numbering schemes can be employed, such as decimal, hexadecimal, octal, etc.

The present invention also provides a way to weight the Intellectual Capital that is now identified by the Intellectual Capital code. For example, this measurement might include: "Last Year Used", as well as "Number of Years Used as User", "Number of Years Used as Planner", "Number of Years Used as Developer", as "Number of Years Used as Implementer" and "Number of Years Used as Certified".

Thus a weighted Intellectual Capital code might look like: "01-09-55-021-233:2000/02/U0D00". This individual would be, for example, a User and Developer for 2 years of IT-Application Software-Email-Server-iMail until the year 2000.

Moreover, a total dollar value of this individual's Intellectual Capital could also be determined based upon this example Intellectual Capital Code of 01-09-55-021-233:2000/02/U0D00. Dollar values may be placed upon each of the measured values. For example, it may be determined that value of the skill associated with the "Last Year Used" drops by $80 per year for each year prior to the present. And, for each year that that skill has been used the value of that skill increased by $120. And, being a User of that skill adds $20. And, that being a Planner of that skill adds $60, that being a Developer of that skill adds $50, that being an Implementer of that skill adds $40, that being Certified in that skill adds $50, and that the skill itself is worth $200. Combining these together, the value of this measured Intellectual Capital Code is $510.

This creates a catalog of skills, categories and codes, and a method of measuring and applying values to an inventory of Intellectual Capital codes created using the skills catalog, which may be stored in a data source. The data source of the present invention may comprise any number of data sources well known to those of skill in the art, such as relational databases or linked files.

Moreover, the standardization of the aforementioned catalog and methods could be regulated through an independent body, to allow transportability of this catalog and methods (or appropriate portions thereof) to different applications where the valuation of Intellectual Capital is necessary. A central repository of the codes would then exist, allowing any business to be able to determine the value of the Human Capital in their organization, and that determination would have meaning to anyone else having knowledge of the coding system.

In addition, in one preferred embodiment of the present invention, a recruiting business can also directly match the skills needed by a job opening to skills that a job seeker holds. The business will further be able to evaluate on that match utilizing the aforementioned valuation technique to significantly decrease the decision making time required by a recruiter in determining the value of a match.

The process in its simplest form will involve a business posting the skills it needs for a particular job, and a job seeker posting the skills they have. Both entities will also post other relevant information such as contact information, relocation, travel, training, education, etc.

The user will be able to select skills using a standard drill down multi-screen elimination process, such as in a sequence of Web forms as discussed in more detail below, or the user will be able to quickly search each hierarchy level name and associated keywords to get a list of appropriate skills. Utilizing this list, the user may also select multiple skills. On the final skill selection screen, the user will be able to enter the measurement characteristics for each skill to create an Intellectual Capital inventory for an individual or an Intellectual Capital requirement for a position.

An individual's Intellectual Capital inventory (as embodied in his individual Intellectual Capital code) may be entered using a variation of the above process, derived from the Intellectual Capital codes contained in the aforementioned skill catalog. In addition, the Intellectual Capital requirements of a job may also be entered using a variation of the above process, derived also from the codes contained in the skill catalog, creating a position requirement set.

Then a simple comparison or match of the Intellectual Capital (skills) inventory of various individuals and the position requirement set will reveal the number of matching skills. The matching skills may also be weighted to allow, for example, early disqualification of candidates for a specific job, and allow zeroing in on properly qualified candidates based upon the candidate's skills inventory compared to the position skills requirement. The results can then be displayed by various means well known to those skilled in the art to the user, based on the weighting or other criteria.

Upon finding prospective job seekers, the user will be able to compare side by side the skills that match and the relationship of the measurements of each skill, e.g. greater or less than the requirements. The user will also be shown the skills that the job seeker lacks and the skills that the job seeker has that the job doesn't require. The user will also be able to view other non-skill related comparisons such as relocation, travel, etc.

Some of the many significant uses of the present invention, which are not capable with the systems of the prior art, are, matching jobs, measuring the Human Capital value of a business, and evaluating training needs. It will also be appreciated to one skilled in the art that the system of the present invention could easily be utilized in a number of additional areas.

The data source interface used to accomplish the above tasks may comprise any of a number of such systems that are well known to those of skill in the art. For example, if the data source is a relational database, then the data source interface may comprise the corresponding database engine used to access that database. The user interface may comprise, for example, a graphical user interface that is integrated with the database engine, or may comprise a separate application, such as an Internet Web browser. Furthermore, the user interface and/or the data source interface may incorporate, for example, an Internet Web server, and possibly associated CGI ("Common Gateway Interface") applications—all of which are well known to those of ordinary skill in the art.

FIG. 1 is a schematic demonstrating the typical components used in a preferred embodiment of the invention when used over the Internet. Those of ordinary skill in the art will appreciate that the present invention, while described below in connection with its use over the Internet, is certainly not limited thereto.

An electronic document, such as a Web page created using HTML, is loaded into Document Viewer 1. Document Viewer 1 may be any software application capable of viewing electronic documents and loading additional electronic documents from within the original document, such as through the use of a hypertext link or form (although not limited thereto).

For example, the Document Viewer could include a Web browser, such as Navigator from Netscape Communications or Microsoft's Internet Explorer. The electronic document may be loaded automatically when Document Viewer 1 is first started, or may be opened into the viewer by the user from a file stored locally or at a remote address. For example, the user may load the document by typing the document's address into the Web browser's command line.

Document Viewer 1 may be accessed by the user through any of a number of computer systems, such as through the use of a terminal connected to a mainframe system, from a personal computer, or over computer connected to a local computer network.

Document Viewer 1 is connected to the Internet along with Personal Computer 2, through Network Connection 3. This connection is typically made through local telephone lines using an analog, ISDN, or DSL connection, though it can be over a direct network connection, such as an Ethernet network and leased line. Network Connection 3 may be a computer network that routes any requests from Document Viewer 1 to the appropriate location on the Internet. This operation is well known to those of skill in the art. Network Connection 3 connects Document Viewer 1 to Web Server 4 through any of a number of well-known connection schemes, such as through the use of leased lines. This combination essentially comprises User Interface 8 in this particular preferred embodiment of the invention.

Web Server 4 is typically a software application running on a remote computer that is capable of forwarding or processing requests from Document Viewer 1. For example, Web Server 4 may include any one of a number of well-known server applications, such as the NSCA Web server, the Apache Web server, etc. Web Server 4 passes a document request from Document Viewer 1 to Data Source Interface 5 for accessing Data Source 6. Data Source 6 contains the complete hierarchical list of Intellectual Capital codes, and the information on each individual, job opening, etc.

After a document, such as an HTML form (or series of forms), is loaded into Document Viewer 1, the user enters in the appropriate information and activates a hypertext link or form "Submit" button, generating a signal back to Data Source Interface 5. This is preferably in the form of an HTTP request sent over the Internet using TCP/IP and possibly a Secure Socket Layer ("SSL"). The request may be routed through Network Connection 3 and through Web Server 4 to Data Source Interface 5. It will be appreciated that the details of HTTP operation in conjunction with TCP/IP and SSL are well known to those of ordinary skill in the art and will, therefore, not be elaborated on here.

When the HTTP request is received by Data Source Interface 5, it accesses Data Source 6 to retrieve the requested information based upon the signal from Document Viewer 1. In one embodiment of the invention, a common gateway interface ("CGI") program, well known to those of skill in the art, may be used to parse the data from Document Viewer 1. This program acts as an interface between the Web Server 4 and/or Data Interface 5 and Data Source 6 by executing a set of instructions. The interaction of Web servers and CGI programs and the sending of information between them is well known to those of ordinary skill in the art.

The CGI program may extract the document information from the information passed to it by the server and retrieve the appropriate information from Data Source 6. This may be accomplished in a number of ways known to those of ordinary skill in the art. For example, if the CGI program is a PERL script or other API, a database access module can be used to interface with the majority of commercial relational database applications. Examples of such databases include Oracle, Sybase, SQL Server, and the like. It is also possible for these systems to be accessed directly by Web Server 4 using their own internal data engines.

Information is submitted to or extracted from Data Source 6, depending on the signal sent by the Document Viewer 1. Data Source Interface 5 then generates a signal back to Document Viewer 1 through Web Server 4.

The system of the present invention may preferably be used by at least five types of users: a prospect, a client, a recruiter, a system manager, and the system administrator. It will be appreciated, however, that the present invention is not limited thereto and may include any users desiring to catalog, inventory, select, measure, value or match Intellectual Capital, or match or inquire as to an individual's particular skills.

Figure 2A:
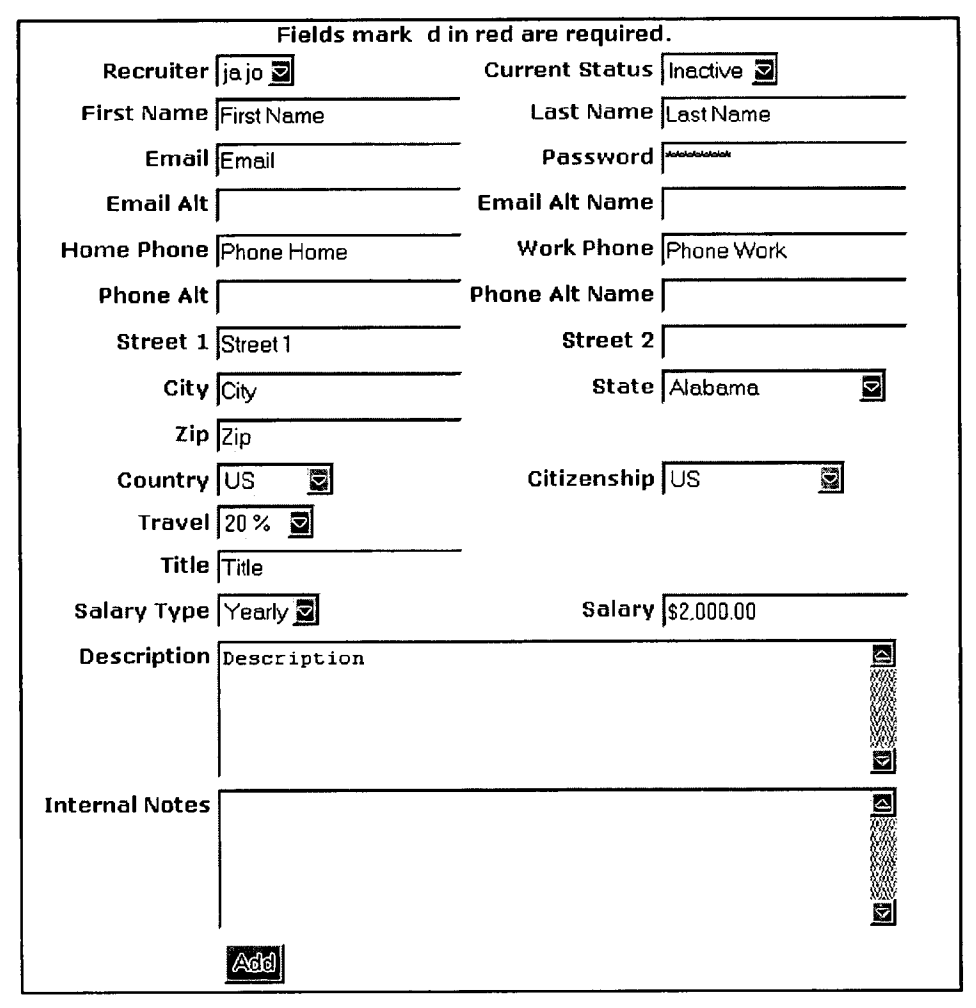
Figure 2B:
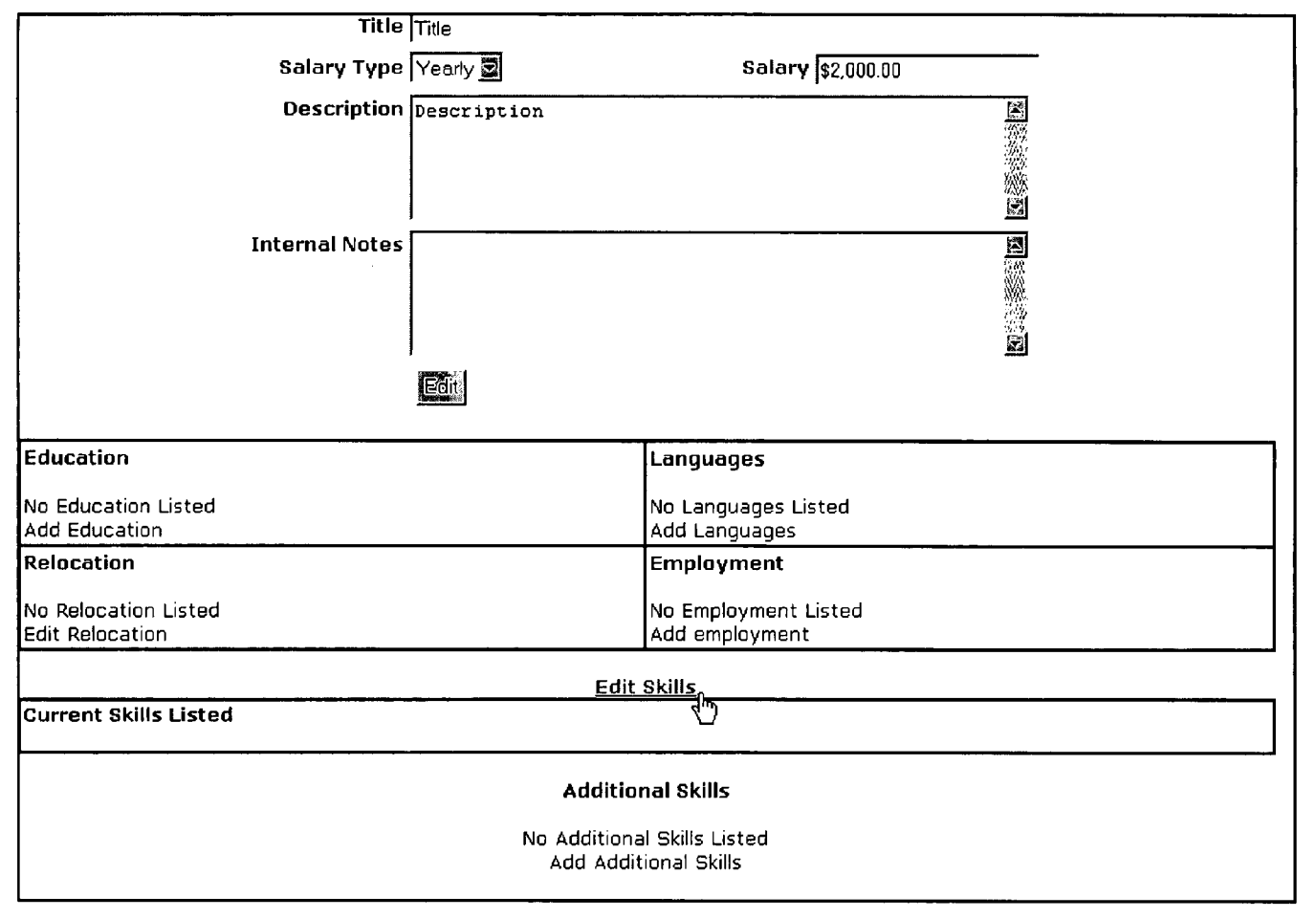
Figure 2C:
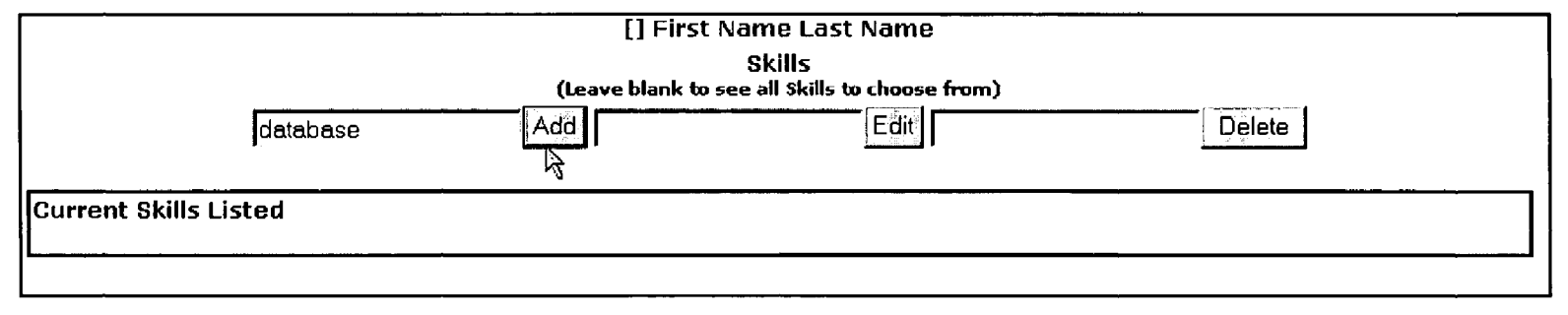
Figure 2D:
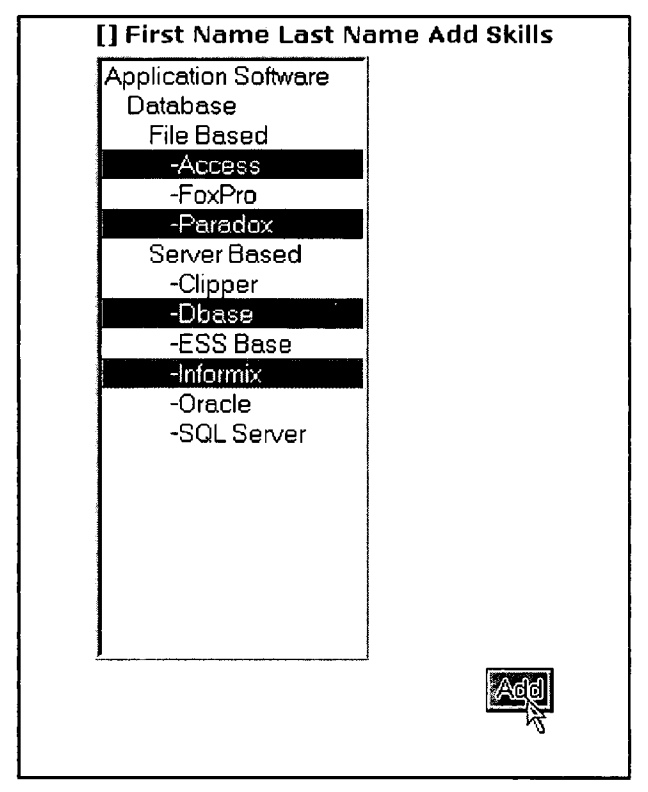
Figure 2E:

A prospect, i.e. an individual desiring to enter his/her Intellectual Capital into the system of the present invention, and/or look for matching job openings, may enter skills into Data Source 6 using a series of HTML forms, as described above, through User Interface 8 and will have the ability to retrieve from Data Source 6 all of the job positions that fit those skills. Examples of such forms are shown in FIGS. 2(*a*)–(*e*).

After receiving a request from the prospect, Data Source Interface 5 conducts a comparison of the information submitted by the prospect with the relevant information in Data Source 6 (e.g. job positions) using the hierarchical set of Intellectual Capital Codes described above. By using the hierarchical Intellectual Capital codes match information, the system of the present invention provides significant benefits over the systems of the prior art, including increased efficiency and accuracy in matching a request (e.g. for job positions) with items stored in the knowledge base.

Data Source Interface 5 then returns a set of results to the prospect through User Interface 8. The results screen sent back by Data Source Interface 5 will display by percentage of match the jobs that the prospect might be interested in. An example of such results screens are shown in FIGS. 3(*a*)–(*c*).

By clicking on one of the results contained therein, the prospect may then retrieve a detailed report from Data Source Interface 5 of the skills required for the position, which skills match his/her profile, and which skills don't. The prospect will have the option at this time to update his/her skill set, if necessary, this updated information is stored in Data Source 6 using the hierarchical set of Intellectual Capital codes discussed above. The prospect will also have the option to submit his/her interest in that position to a recruiter via email, or similar messaging systems well known to those of skill in the art.

The recruiter would then receive an email message from Web Server 4 or Data Source Interface 5 through Email Server 7 in a conventional manner with all the pertinent information needed to contact the prospect. The prospect also has the ability to edit their own Intellectual Capital codes in Data Source 6 through the use of a unique username and password.

A client, e.g. an employer using a recruiter that participates in the system of the present invention and looking for job candidates, enters their position information in a similar manner and receives a similar results page from Data Source Interface 5. The results from Data Source Interface 5 will display by percentage the prospects that match the job by Intellectual Capital Codes—all personal information for the candidate stored in Data Source 6 may be left out. By clicking one of the results, the client can see exactly what skills the prospect has and what skills match. The client will have the ability to edit the position skills, adding or deleting skills as needed. The client will also have the option of submitting a prospect information request to the responsible recruiter—using email for example.

Each recruiter has control over prospects and clients they are assigned to. They can enter/update in Data Source 6 information about both prospects and clients, and can perform any of the tasks described above. The recruiter can also start the interview process during any phase by clicking an appropriate link provided on their HTML forms. This will retrieve a screen from Data Source 5 that will allow the recruiter to send a resume to any of the contacts listed in with a matching client's information. A recruiter's access may be limited to clients, prospects and interviews that are assigned to them, and, in this situation, a recruiter can only add clients, prospects, positions and the interviews that go with them.

The system manager has control over all aspects of the "Web site" (the combination of Web Server 4, Data Interface 5, and Data Source 6) including adding and deleting recruiters from the system and viewing recruiter activity reports. The manager has total control over all clients and prospects, and has total editorial control over all interview entries. In a preferred embodiment of the invention, the manager can only add recruiters, clients, prospects and interviews.

The system administrator is responsible for the technical administration of the system and preferably has total unrestricted control over all users of Web Site.

The client recruiter (i.e. a recruiter working for a client), managers, and administrators all have control of the "interview process." Taking this ability away from prospect recruiters provides the significant advantage that it allows for a more controlled process, and provides for responsibility in the interview process.

The interview process controls the flow of the interview status between the prospect and the client when the prospect is submitted for a position. Using, for example, a set of dropdown boxes on an HTML form to select the prospect and client, the recruiter can send the prospect's resume to the client through the use of the aforementioned Web site. Once the entry has been made, Data Source Interface 5 creates a record in Data Source 6 that will track the process. The preferred default phases are: Send Resume, Initial Interview, 2nd Interview, Tech Interview, Face to Face, Offer, Offer Accepted, Offer Rejected, Start At Work, Other, and Delete. The particular names and order of the phases can be changed by the administrator through the set up screen, and are not limited thereto.

During each phase, the client recruiter can choose to send out a preformatted email that informs each party involved of the action that took place. For example, if an Initial Interview was set by the client recruiter, an email can be sent automatically by the system containing all of the information needed to carry on that interview: phone numbers, times, names of everyone involved. These emails can be configured by the administrator through the setup screen or left at program defaults. They are then generated dynamically by the system and sent at the appropriate time.

Preferably, only the client recruiter (and managers and administrators) can edit an interview. This is to ensure the client recruiter is in total control of the interview process.

The ownership of a client or prospect may determined during login to the system of the present invention through Document Viewer 1, when a cookie file (well known to those in the art) is placed on Personal Computer 2, or other identification methods (also well known to those in the art) that will identify the user to the system. Ownership of clients and prospects is defined in Data Source 6. Managers and administrators are preferably the only users that can change ownership, as this will enforce the integrity of the information.

Initially, an organization using the system of the present invention will preferably determine the nature of Intellectual Capital that they desire based on a target market, i.e., Oracle, JD Edwards, etc. Each Data Source 6 in each such system of the present invention may be populated with skills and Intellectual Capital Codes from the Central Repository 9 (described above) based on the appropriate Intellectual Capital catalog needed, and will be oriented towards the user based on the job or project in question.

For example, in an embodiment of the present invention used by an organization in the Information Technology (IT) sector, Data Source 6 would be populated only with Intellectual Capital code information related thereto, excluding other industries and business sectors. The administrator will populate Data Source 6 with the information on each recruiter associated with the organization. Each recruiter using that system will then be able to input clients, prospects, and positions.

Both clients and prospects will be able to remotely enter their starting information on the Web site without recruiter intervention, however after that preferably the recruiter will control their entries. Clients will preferably have a password to allow them to submit new positions. The recruiter will be notified by email and they will make the final decision whether the job is approved or deleted.

Once positions and prospects are entered into the database, the recruiter will be able to match them using the Intellectual Capital codes. This matching can generate both the position choices for the prospect, as well as the prospect choices for the position based on the predefined Intellectual Capital codes built into the portion of Central Repository 9 included in Data Source 6. This is preferably a weighted match using a weighted Intellectual Capital code (as described above). From this screen, the recruiter will be able to initiate the Interview Process.

The recruiter upon finding a match sufficient to fulfill the skills requirements for a position, will then begin the Interview Process by submitting a resume to the client. The Interview Process will be controlled and monitored from within that portion of the Web site, providing a consistent method to follow and ensure communication is maintained.

The organization will have the ability to measure performance and monitor progress through a series of reports available to them from the information stored in Data Source 6.

Although this invention has been described with reference to particular embodiments, it will be appreciated that many variations may be resorted to without departing from the spirit and scope of this invention. For example, the user interface, data source interface, and data source of the present invention may comprise a single software application, and may be operated from a single computer or a network of computers via the Internet or an internal intranet. Moreover, for example, a network of personal computers may be used, a mainframe system, or a server and peripheral thin clients.

We claim:

1. In a method using a machine for cataloging the Intellectual Capital of individuals, said individuals having individual skills, the method comprising the steps of:
    establishing a hierarchical list of Intellectual Capital categories with a plurality of levels;
    assigning said skills to said Intellectual Capital categories on each of said levels;
    assigning an Intellectual Capital code to each of said assigned skills, said Intellectual capital code comprising a series of one or more alphanumeric symbols assigned to said skills to correspond to said hierarchical list of intellectual capital categories; and
    using said machine at least to add at least one weighting factor to at least one of said Intellectual Capital code, wherein said weighting factor represents experience in said skills represented by said Intellectual Capital codes, and to store one or more selected from the group consisting of said Intellectual capital code, said weighting factor, and a combination of said Intellectual capital code and said weighting factor.

2. The method of claim 1, wherein said hierarchical list of Intellectual Capital categories comprises one or more selected from the group consisting of:
    (1) Class
    (2) Knowledge Group
    (3) Skill Group
    (4) Skill Set
    (5) Skills.

3. The method of claim 1, further comprising the step of storing at least a portion of said Intellectual Capital codes in a machine-readable data source.

4. The method of claim 3, further comprising the steps of:
    determining the skills of at least one of said individuals;
    identifying said Intellectual Capital code in said data source that corresponds to at least one of said individual's skills; and
    storing said selected individual Intellectual Capital codes in said machine-readable data source for said individual.

5. The method of claim 3, further comprising the steps of:
    determining position requirements for at least one position;
    identifying said Intellectual Capital code in said machine-readable data source that corresponds to at least one of said position requirements; and
    storing said Intellectual Capital codes that corresponds to at least one of said position requirements in said data source for said position.

6. The method of claim 5, further comprising the steps of:
    comparing at least one of said position Intellectual Capital codes to at least one of said individual Intellectual Capital codes; and
    selecting at least one of said individuals based upon said comparison.

7. The method of claim 5, further comprising the steps of:
    comparing at least one of said individual Intellectual Capital codes to at least one of said position Intellectual Capital codes; and
    selecting at least one of said positions based upon said comparison.

8. The method of claim 3, further comprising the step of storing additional identifying information for said individual in said machine-readable data source.

9. The method of claim 8, wherein additional information includes one or more selected from the group consisting of contact information, relocation, travel, training, and education.

10. The method of claim 1, wherein said weighting factor is based upon one or more selected from the group consisting of "Last Year Used", "Number of Years Used as User", "Number of Years Used as Planner", "Number of Years Used as Developer", as "Number of Years Used as Implementer" and "Number of Years Used as Certified".

11. The method of claim 3, further comprising the steps of:
    assigning a monetary value to at least one of said Intellectual Capital codes of at least one of said individuals;
    storing said monetary value in said machine-readable data source; and
    computing a value for said selected individual based upon said monetary value.

12. The method of claim 1, wherein said Intellectual Capital code is alphanumeric.

13. The method of claim 12, wherein said Intellectual Capital code is selected from the group consisting of binary, octal, decimal, and hexadecimal.

14. The method of claim 4, wherein said hierarchical list of Intellectual Capital categories, said Intellectual Capital codes, and said weighting factor are stored in a central repository, and wherein said steps of determining the skills of at least one of said individuals; identifying said Intellectual Capital code in said machine-readable data source that corresponds to at least one of said individual's skills; and storing said selected individual Intellectual Capital codes occur in a remote location from said central repository.

15. The method of claim 3, wherein said machine-readable data source is accessed over the Internet.

16. The method of claim 3, wherein said machine-readable data source is accessed using one or more selected from the group consisting of drill down forms, search forms, and keyword searches.

17. The method of claim 3, wherein said machine-readable data source is accessible by one or more users selected from the group consisting of a prospect, a client, a recruiter, a system manager, and a system administrator.

18. The method of claim 17, further comprising the steps of:
    determining the skills of at least one of said prospects;
    identifying said Intellectual Capital code in said machine-readable data source that corresponds to at least one of said prospect's skills;
    storing said selected prospect Intellectual Capital codes in said machine-readable data source for said prospect;
    determining the client position requirements for at least one position with at least one of said clients;
    identifying at least one of said client position Intellectual Capital codes in said machine-readable data source that corresponds to at least one of said client position requirements; and
    storing said selected client position Intellectual Capital codes in said machine-readable data source for said client position.

19. The method of claim 18, further comprising the steps of:
    receiving a request for at least one client position from at least one of said prospects wherein said request contains at least one client position requirement for said client position;
    comparing said request to at least a portion of said client positions in said machine-readable data source; and
    selecting at least one of said client positions based upon said comparison.

20. The method of claim 19, further comprising the steps of:
    comparing said selected client position to said prospect;
    preparing a comparison report based upon said comparison; and
    returning said comparison report to said prospect.

21. The method of claim 19, further comprising the step of communicating said prospect's interest in said selected client position to said recruiter.

22. The method of claim 18, further comprising the steps of:
    receiving a request for at least one prospect from at least one of said clients wherein said request contains at least one prospect skill for said prospect;
    comparing said request to at least a portion of said prospect skills in said machine-readable data source; and
    selecting at least one of said prospects based upon said comparison.

23. The method of claim 22, further comprising the steps of:
    comparing said selected prospect to said client position;
    preparing a comparison report based upon said comparison; and
    returning said comparison report to said client.

24. The method of claim 22, further comprising the step of communicating said client's interest in said selected prospect to said recruiter.

25. The method of claim 18, further comprising the steps of:
    receiving a request for at least one client position from at least one of said recruiters wherein said request contains at least one client position requirement;
    comparing said request to at least a portion of said client positions in said machine-readable data source; and
    selecting at least one of said client positions based upon said comparison.

26. The method of claim 18, further comprising the steps of:
    receiving a request for at least one prospect from at least one of said recruiters wherein said request contains at least one prospect skill;
    comparing said request to at least a portion of said prospect skills in said machine-readable data source; and
    selecting at least one of said prospects based upon said comparison.

27. The method of claim 21, further comprising the step of sending at least a portion of said prospect's skills to said client to initiate an interview process.

28. The method of claim 27, further comprising the step of scheduling and tracking said interview process between said prospect and said client.

29. The method of claim 28, wherein said interview process comprises one or more steps selected from the group consisting of:
    (1) Send Resume
    (2) Initial Interview
    (3) $2^{nd}$ Interview
    (4) Tech Interview
    (5) Face to Face
    (6) Offer
    (7) Offer Accepted
    (8) Offer Rejected
    (9) Start At Work
    (10) Other
    (11) Delete.

30. The method of claim 28, wherein said recruiters communicates information related to said interview process between said prospect and said client.

31. The method of claim 30, wherein said communication is conducted using electronic mail.

32. In a method using a machine for cataloging the Intellectual Capital of individuals, said individuals having individual skills, the method comprising the steps of:
    establishing a hierarchical list of Intellectual Capital categories with a plurality of levels;
    assigning said skills to said Intellectual Capital categories on each of said levels;
    assigning an Intellectual Capital code to each of said assigned skills;
    adding at least one weighting factor to at least one of said Intellectual Capital codes, wherein said weighting factor represents experience in said skill represented by said Intellectual Capital code; and
    storing said hierarchical list, said Intellectual Capital codes, and said weighting factor in a machine-readable form in a central repository.

33. In a method using a machine for cataloging the Intellectual Capital of individuals, said individuals having individual skills, the method comprising the steps of:
    establishing a hierarchical list of Intellectual Capital categories with a plurality of levels;
    assigning said skills to said Intellectual Capital categories on each of said levels;
    assigning an Intellectual Capital code to each of said assigned skills;
    adding at least one weighting factor to at least one of said Intellectual Capital codes, wherein said weighting factor represents experience in said skill represented by said Intellectual Capital code;
    storing said Intellectual Capital codes for at least one of said individuals in a machine-readable data source;
    determining position requirements for at least one position;
    identifying said Intellectual Capital codes that corresponds to at least one of said client position requirements;
    storing said Intellectual Capital codes for at least one client position in said machine-readable data source;
    selecting at least one of said individuals in said machine-readable data source;
    comparing at least one of said individual's skills and at least one of said position requirements; and
    preparing a comparison report based upon said comparison.

34. An apparatus for cataloging the Intellectual Capital of individuals, said individuals having individual skills, said apparatus comprising:
    a machine-readable data source stored on a machine-readable medium, said data source
    containing, in machine-readable form, data having a structure comprising an individual Intellectual Capital code for at least one of said individuals, wherein said individual Intellectual Capital code is determined by a hierarchical list of Intellectual Capital categories having a plurality of levels, wherein said individual's skills are assigned to said Intellectual Capital categories, wherein an Intellectual Capital code is assigned to each of said assigned individual skills, said Intellectual capital code comprising a series of one or more alphanumeric symbols assigned to said skills to correspond to said hierarchical list of intellectual capital categories, and wherein at least one of said Intellectual Capital code contains at least one weighting factor representing said individual's experience in said skill represented by said Intellectual Capital code;

a user interface for submitting position requirements for at least one position to said machine-readable data source;

a data source interface communicating between said user interface and said machine-readable data source, wherein said data source interface is capable of:
  (1) identifying said Intellectual Capital code in said machine-readable data source that corresponds to at least one of said position requirements; and
  (2) storing said selected position Intellectual Capital code in said machine-readable data source for said position.

35. The apparatus of claim 34, wherein said hierarchical list of Intellectual Capital categories comprises one or more selected from the group consisting of:
  (1) Class
  (2) Knowledge Group
  (3) Skill Group
  (4) Skill Set
  (5) Skill Level.

36. The apparatus of claim 34, further comprising:
a user interface for submitting said skills of said individual to said machine-readable data source;
a data source interface communicating between said user interface and said machine-readable data source, wherein said machine-readable data source is capable of:
  (1) identifying said Intellectual Capital codes in said machine-readable data source which correspond to each of said individual's skills; and
  (2) storing said selected individual Intellectual Capital codes in said machine-readable data source for said individual.

37. The apparatus of claim 34, wherein said data source interface is further capable of:
  (1) comparing at least one of said position Intellectual Capital codes to at least one of said individual Intellectual Capital codes; and
  (2) selecting at least one of said individuals based upon said comparison.

38. The apparatus of claim 34, wherein said data source interface is further capable of:
  (1) comparing at least one of said individual Intellectual Capital codes to at least one of said position Intellectual Capital codes; and
  (2) selecting at least one position based upon said comparison.

39. The apparatus of claim 34, wherein said user interface is further capable of
submitting additional identifying information for said individual to said machine-readable data source and said machine-readable data source is further capable of storing said additional information.

40. The apparatus of claim 37, wherein said additional information includes one or more selected from the group consisting of contact information, relocation, travel, training, and education.

41. The apparatus of claim 34, wherein said weighting factor is one or more selected from the group consisting of "Last Year Used", "Number of Years Used as User", "Number of Years Used as Planner", "Number of Years Used as Developer", as "Number of Years Used as Implementer" and "Number of Years Used as Certified".

42. The apparatus of claim 36, wherein said user interface is further capable of assigning a monetary value to at least one of said skills of at least one of said individuals; and wherein said data source interface is further capable of:
  (1) storing said monetary value in said machine-readable data source;
  (2) selecting at least one of said individuals from said data source for which at least one monetary value has been assigned to at least one skill of said individual; and
  (3) computing a value for said selected individual based upon said monetary value.

43. The apparatus of claim 34 wherein said Intellectual Capital code is alphanumeric.

44. The apparatus of claim 43, wherein said Intellectual Capital code is selected from the group consisting of binary, octal, decimal, and hexadecimal.

45. The apparatus of claim 34, wherein said machine-readable data source is accessed over the Internet.

46. The apparatus of claim 45, wherein said machine-readable data source is accessed using one or more selected from the group consisting of drill down forms, search forms, and keyword searches.

47. The apparatus of claim 34, wherein said machine-readable data source is accessible by one or more users selected from the group consisting of prospects, clients, recruiters, system managers, and system administrators.

48. The apparatus of claim 47, further comprising:
a user interface capable of:
  (1) submitting the skills of at least one of said prospects to said machine-readable data source; and
  (2) submitting the requirements for at least one position with at least one of said clients;
a data source interface communicating between said user interface and said machine-readable data source, wherein said data source interface is capable of:
  (1) identifying said Intellectual Capital code in said machine-readable data source that corresponds to at least one of said prospect's skills;
  (2) storing said selected prospect Intellectual Capital code in said machine-readable data source for said prospect;
  (3) identifying said Intellectual Capital code in said machine-readable data source that corresponds to at least one client position;
  (4) storing said selected client position Intellectual Capital code in said machine-readable data source for said client position;
  (5) comparing at least a portion of said submission from said user interface to at least a portion of said selected client position Intellectual Capital codes in said machine-readable data source; and
  (6) comparing at least a portion of said submission from said user interface to at least a portion of said selected prospect Intellectual Capital codes in said machine-readable data source.

49. The apparatus of claim 47, wherein said data interface is further capable of communicating said client's interest in said selected prospect to said recruiter.

50. The apparatus of claim 47, wherein said data interface is further capable of sending at least a portion of said prospect's skills to said client to initiate an interview process.

51. The apparatus of claim 47, wherein said data interface is further capable of scheduling and tracking said interview process between said prospect and said client.

52. The apparatus of claim 51, wherein said interview process comprises one or more steps selected from the group consisting of:
   (1) Send Resume
   (2) Initial Interview
   (3) $2^{nd}$ Interview
   (4) Tech Interview
   (5) Face to Face
   (6) Offer
   (7) Offer Accepted
   (8) Offer Rejected
   (9) Start At Work
   (10) Other
   (11) Delete.

53. The apparatus of claim 50, wherein said data interface is further capable of communicating information related to said interview process between said prospect and said client under the control of said recruiter.

54. The apparatus of claim 53, wherein said communication is conducted using electronic mail.

55. The method of claim 50, wherein said machine-readable data source comprises a relational database.

56. The apparatus of claim 34, wherein said machine-readable data source comprises a relational database.

57. An apparatus for cataloging the Intellectual Capital of individuals, said individuals having individual skills, said apparatus comprising:
   a central repository, said central repository containing data having a structure comprising a machine-readable hierarchical list, stored on a machine-readable medium, of Intellectual Capital categories having a plurality of levels, wherein said skills are assigned to said Intellectual Capital categories, and wherein an Intellectual Capital code is assigned to each of said assigned skills, said Intellectual capital code comprising a series of one or more alphanumeric symbols assigned to said skills to correspond to said hierarchical list of intellectual capital categories; and
   a remote machine-readable data source, said remote machine-readable data source containing data having a structure comprising an individual Intellectual Capital code for at least one of said individuals, wherein said individual Intellectual Capital code is a combination of at least one Intellectual Capital code from each of said Intellectual Capital categories, and wherein said individual Intellectual Capital code contains at least one weighting factor representing said individual's experience in said skills represented by said combined Intellectual Capital codes.

58. A computer-accessible medium containing computer program for cataloging the Intellectual Capital of individuals, said individuals having individual skills, said computer program being embodied on at least one physical media, said computer program being capable of:
   using a computer in establishing a hierarchical list of Intellectual Capital categories with a plurality of levels;
   using a computer in assigning said skills to said Intellectual Capital categories on each of said levels;
   using a computer in assigning an Intellectual Capital code to each of said assigned skills, said Intellectual capital code comprising a series of one or more alphanumeric symbols assigned to said skills to correspond to said hierarchical list of intellectual capital categories; and
   using a computer in adding at least one weighting factor to at least one of said Intellectual Capital code, wherein said weighting factor represents experience in said skills represented by said Intellectual Capital codes.

59. The computer program of claim 58, wherein said hierarchical list of Intellectual Capital categories comprises one or more selected from the group consisting of:
   (1) Class
   (2) Knowledge Group
   (3) Skill Group
   (4) Skill Set
   (5) Skills.

60. The computer program of claim 58, further comprising the step of storing at least a portion of said Intellectual Capital codes in a computer-readable data source.

61. The computer program of claim 60, further comprising the steps of:
   using a computer in determining the skills of at least one of said individuals;
   using a computer in identifying said Intellectual Capital code in said computer-readable data source that corresponds to at least one of said individual's skills; and
   using a computer in storing said selected individual Intellectual Capital codes in said computer-readable data source for said individual.

62. The computer program of claim 60, further comprising the steps of:
   using a computer in determining position requirements for at least one position;
   using a computer in identifying said Intellectual Capital code in said data source that corresponds to at least one of said position requirements; and
   using a computer in storing said Intellectual Capital codes that corresponds to at least one of said position requirements in said computer-readable data source for said position.

63. The computer program of claim 61, further comprising the steps of:
   using a computer in comparing at least one of said position Intellectual Capital codes to at least one of said individual Intellectual Capital codes; and
   using a computer in selecting at least one of said individuals based upon said comparison.

64. The computer program of claim 62, further comprising the steps of:
   using a computer in comparing at least one of said individual Intellectual Capital codes to at least one of said position Intellectual Capital codes; and
   using a computer in selecting at least one of said positions based upon said comparison.

65. The computer program of claim 60, further comprising the step of using a computer in storing additional identifying information for said individual in said computer-readable data source.

66. The computer program of claim 65, wherein additional information includes one or more selected from the group consisting of contact information, relocation, travel, training, and education.

67. The computer program of claim 58, wherein said weighting factor is based upon one or more selected from the group consisting of "Last Year Used", "Number of Years Used as User", "Number of Years Used as Planner", "Number of Years Used as Developer", as "Number of Years Used as Implementer" and "Number of Years Used as Certified".

68. The computer program of claim 60, further comprising the steps of:
   using a computer in assigning a monetary value to at least one of said Intellectual Capital codes of at least one of said individuals;
   using a computer in storing said monetary value in said computer-readable data source; and
   using a computer in computing a value for said selected individual based upon said monetary value.

69. The computer program of claim 58, wherein said Intellectual Capital code is alphanumeric.

70. The computer program of claim 69, wherein said Intellectual Capital code is selected from the group consisting of binary, octal, decimal, and hexadecimal.

71. The computer program of claim 61, wherein said hierarchical list of Intellectual Capital categories, said Intellectual Capital codes, and said weighting factor are stored in a central repository, and wherein said steps of determining the skills of at least one of said individuals; identifying said Intellectual Capital code in said computer-readable data source that corresponds to at least one of said individual's skills; and storing said selected individual Intellectual Capital codes occur in a remote location from said central repository.

72. The computer program of claim 60, wherein said computer-readable data source is accessed over the Internet.

73. The computer program of claim 60, wherein said computer-readable data source is accessed using one or more selected from the group consisting of drill down forms, search forms, and keyword searches.

74. The computer program of claim 60, wherein said computer-readable data source is accessible by one or more users selected from the group consisting of a prospect, a client, a recruiter, a system manager, and a system administrator.

75. The computer program of claim 74, further comprising the steps of:
   using a computer in determining the skills of at least one of said prospects;
   using a computer in identifying said Intellectual Capital code in said computer-readable data source that corresponds to at least one of said prospect's skills;
   using a computer in storing said selected prospect Intellectual Capital codes in said computer-readable data source for said prospect;
   using a computer in determining the client position requirements for at least one position with at least one of said clients;
   using a computer in identifying at least one of said client position Intellectual Capital codes in said computer-readable data source that corresponds to at least one of said client position requirements; and
   using a computer in storing said selected client position Intellectual Capital codes in said computer-readable data source for said client position.

76. The computer program of claim 75, further comprising the steps of:
   using a computer in receiving a request for at least one client position from at least one of said prospects wherein said request contains at least one client position requirement for said client position;
   using a computer in comparing said request to at least a portion of said client positions in said computer-readable data source; and
   using a computer in selecting at least one of said client positions based upon said comparison.

77. The computer program of claim 76, further comprising the steps of:
   using a computer in comparing said selected client position to said prospect;
   using a computer in preparing a comparison report based upon said comparison; and
   using a computer in returning said comparison report to said prospect.

78. The computer program of claim 76, further comprising the step of using a computer in communicating said prospect's interest in said selected client position to said recruiter.

79. The computer program of claim 75, further comprising the steps of:
   using a computer in receiving a request for at least one prospect from at least one of said clients wherein said request contains at least one prospect skill for said prospect;
   using a computer in comparing said request to at least a portion of said prospect skills in said computer-readable data source; and
   using a computer in selecting at least one of said prospects based upon said comparison.

80. The computer program of claim 79, further comprising the steps of:
   using a computer in comparing said selected prospect to said client position;
   using a computer in preparing a comparison report based upon said comparison; and
   using a computer in returning said comparison report to said client.

81. The computer program of claim 79, further comprising the step of using a computer in communicating said client's interest in said selected prospect to said recruiter.

82. The computer program of claim 75, further comprising the steps of:
   using a computer in receiving a request for at least one client position from at least one of said recruiters wherein said request contains at least one client position requirement;
   using a computer in comparing said request to at least a portion of said client positions in said computer-readable data source; and
   using a computer in selecting at least one of said client positions based upon said comparison.

83. The computer program of claim 75, further comprising the steps of:
   using a computer in receiving a request for at least one prospect from at least one of said recruiters wherein said request contains at least one prospect skill;
   using a computer in comparing said request to at least a portion of said prospect skills in said computer-readable data source; and
   using a computer in selecting at least one of said prospects based upon said comparison.

84. The computer program of claim 78, further comprising the step of using a computer in sending at least a portion of said prospect's skills to said client to initiate an interview process.

85. The computer program of claim 84, further comprising the step of using a computer in scheduling and tracking said interview process between said prospect and said client.

86. The computer program of claim 85, wherein said interview process comprises one or more steps selected from the group consisting of:
(1) Send Resume
(2) Initial Interview
(3) 2$^{nd}$ Interview
(4) Tech Interview
(5) Face to Face
(6) Offer
(7) Offer Accepted
(8) Offer Rejected
(9) Start At Work
(10) Other
(11) Delete.

87. The computer program of claim 85, wherein said recruiters communicates information related to said interview process between said prospect and said client.

88. The computer program of claim 87, wherein said communication is conducted using electronic mail.

* * * * *